US009450330B2

(12) United States Patent
Peters

(10) Patent No.: US 9,450,330 B2
(45) Date of Patent: Sep. 20, 2016

(54) CONNECTOR ASSEMBLY FOR AN INDUCTIVELY COUPLED PLASMA SOURCE

(71) Applicant: AGILENT TECHNOLOGIES, INC., Loveland, CO (US)

(72) Inventor: Craig Peters, Port Melbourne (AU)

(73) Assignee: Agilent Technologies, Inc., Santa Clara, CA (US)

( * ) Notice: Subject to any disclaimer, the term of this patent is extended or adjusted under 35 U.S.C. 154(b) by 138 days.

(21) Appl. No.: 14/319,339

(22) Filed: Jun. 30, 2014

(65) Prior Publication Data

US 2015/0380864 A1 Dec. 31, 2015

(51) Int. Cl.

| | |
|---|---|
| ***G01J 3/30*** | (2006.01) |
| ***H01R 13/52*** | (2006.01) |
| ***H01J 49/10*** | (2006.01) |
| ***H01R 13/622*** | (2006.01) |
| *H01R 13/00* | (2006.01) |

(52) U.S. Cl.

CPC ......... *H01R 13/5219* (2013.01); *H01J 49/105* (2013.01); *H01R 13/622* (2013.01); *H01R 13/005* (2013.01)

(58) Field of Classification Search

CPC ... G01J 3/443; H01R 13/5219; G01N 21/73; G01N 21/68; H01J 49/105; H05H 1/30

USPC ................................................ 356/300–445

See application file for complete search history.

(56) References Cited

U.S. PATENT DOCUMENTS 3,495,063 A 2/1970 Miller
4,551,609 A 11/1985 Falk
4,686,113 A * 8/1987 Delfino ................. C23C 16/507 118/50.1
2002/0034000 A1 3/2002 Hoult et al.
2003/0057374 A1 3/2003 Schuebel et al.
2003/0146386 A1 8/2003 Nagoshi et al.
2009/0297998 A1* 12/2009 Offredi .................. F23Q 3/006 431/258
2013/0264014 A1 10/2013 Iizuka

FOREIGN PATENT DOCUMENTS

CA 2293665 12/1999
CN 1425187 6/2003
WO WO2005062883 A2 7/2005

OTHER PUBLICATIONS

Bruker, "Hyperion Series FT-IR Microscopes."
"Ezylog argon connector", ICP-OES/ICP-MS Supplies and Accessories, Glass Expansion Catalogue, Issue 8, p. 4.

* cited by examiner

*Primary Examiner* — Abdullah Nur

(57) ABSTRACT

A connector assembly configured to join an induction coil to a radio frequency generator to provide together with a plasma torch, an inductively coupled plasma source for a spectrometer is disclosed. The connector assembly includes a radial clamping member associated with the radio frequency generator and a sealing member. The radial clamping member has an internal surface configured to receive an end of an induction coil. The connector assembly is configured to provide a secure connection between the end of the induction coil and the RF generator that is substantially electrically conductive and substantially liquid-tight without causing lasting deformation of the radial clamping member or the induction coil. An inductively coupled plasma spectrometer comprising such a connector assembly and a method for securing a connection between an induction coil and a radio frequency generator are also disclosed.

20 Claims, 7 Drawing Sheets

CONNECTOR ASSEMBLY FOR AN INDUCTIVELY COUPLED PLASMA SOURCE

BACKGROUND

Inductively coupled plasma (ICP) spectroscopy is capable of detecting the presence of very low levels of chemical elements in samples which are the subject of analysis. An inductively coupled plasma spectrometer consists of two main components: the spectrometer and an inductively coupled plasma source.

The inductively coupled plasma source comprises a plasma torch and an induction coil (also known as the "output" or "work" coil) for generating and sustaining a plasma by coupling electro-magnetic energy to a suitable gas, such as argon, which flows through the torch. The induction coil is typically formed into a helix and is positioned concentrically around the portion of the torch where the plasma is to be generated.

The induction coil is typically connected to a radio frequency (RF) generator using a compression style fitting. The connection between the induction coil and RF generator must be electrically conductive. Also, since RF power dissipation requires the induction coil to be water-cooled the coupling means between the induction coil and the RF generator must be water-tight.

Certain known inductively coupled plasma (ICP) spectroscopy systems use a compression-style fitting to achieve a water-tight seal and electrical conductivity across the joint. This style of fitting includes an "olive" or "ferrule" component and a nut, where the ferrule is permanently pressed down on the induction coil when the nut is tightened there over during installation. This causes the olive or ferrule and the tubing of the induction coil to be permanently deformed, thereby forming a water-tight and electrically conductive joint.

A disadvantage of known coupling means is that the induction coil can only be fitted and aligned a single time. If the alignment of the induction coil relative to the torch and the RF generator is not optimized when the nut is tightened during the initial installation, it is not possible to subsequently alter the position of the induction coil after deformation of the ferrule and the tubing of the induction coil has occurred. Another disadvantage is that once the induction coil is fitted to one instrument, it cannot be removed and re-used in another instrument because mechanical tolerance differences between instruments make it unlikely that it will install concentrically around a torch in a different instrument. Moreover, friction between the ferrule and the nut causes a twisting torque to be exerted on the tubing of the induction coil when the nut is tightened during installation. This twisting torque distorts the precision formed induction coil, thereby varying the pitch of the coil and degrading the performance of the inductor. Distortion of the coil also affects the axial concentricity of the induction coil around the plasma torch, affecting the position of the plasma within the torch therefore affecting the performance of the instrument.

What is needed therefore, is an improved connector assembly which overcomes at least one or more shortcomings of known compression style fittings described above.

BRIEF DESCRIPTION OF DRAWINGS

The described embodiments are best understood from the following detailed description when read with the accompanying drawing figures. It is emphasized that the various features are not necessarily drawn to scale. In fact, the dimensions may be arbitrarily increased or decreased for clarity of discussion. Wherever applicable and practical, like reference numerals refer to like elements.

DETAILED DESCRIPTION

Figure 1:
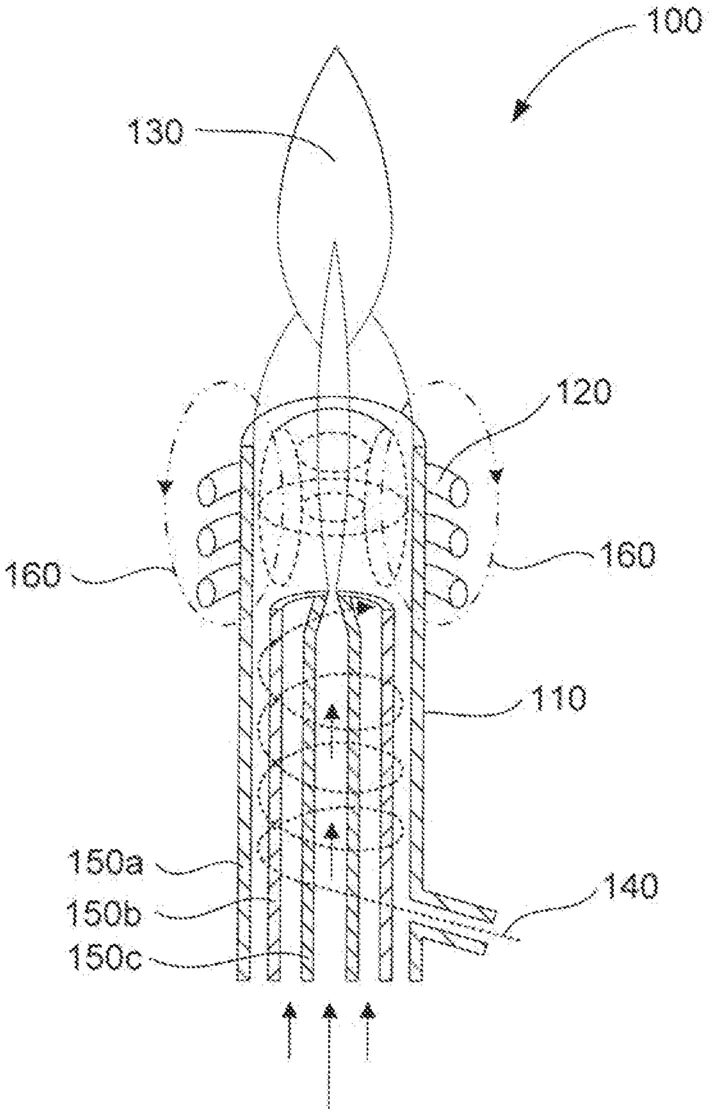
FIG 1 (PRIOR ART)
FIG. 1 shows a cross-sectional view of a typical known inductively coupled plasma (ICP) source.

In the following detailed description, for purposes of explanation and not limitation, specific details are set forth in order to provide a thorough understanding of illustrative embodiments according to the present teachings. However, it will be apparent to one having ordinary skill in the art having had the benefit of the present disclosure that other embodiments according to the present teachings that depart from the specific details disclosed herein remain within the scope of the appended claims. Moreover, descriptions of well-known apparatuses and methods may be omitted so as to not obscure the description of the illustrative embodiments. Such methods and apparatuses are clearly within the scope of the present teachings.

It is to be understood that the terminology used herein is for purposes of describing particular embodiments only, and is not intended to be limiting. The defined terms are in addition to the technical and scientific meanings of the defined terms as commonly understood and accepted in the technical field of the present teachings.

As used in the specification and appended claims, the terms "a", "an" and "the" include both singular and plural referents, unless the context clearly dictates otherwise. Thus, for example, "a device" comprises one device and plural devices.

As used in the specification and appended claims, and in addition to their ordinary meanings, the terms "substantial" or "substantially" mean to within acceptable limits or degree. For example, "substantially cancelled" means that one skilled in the art would consider the cancellation to be acceptable. As used in the specification and the appended claims and in addition to its ordinary meaning, the term "approximately" or "about" means to within an acceptable limit or amount to one having ordinary skill in the art. For example, "approximately the same" means that one of ordinary skill in the art would consider the items being compared to be the same.

Generally, it is understood that the drawings and the various elements depicted therein are not drawn to scale. Further, relative terms, such as “above,” “below,” “top,” “bottom,” “upper” and “lower” are used to describe the various elements’ relationships to one another, as illustrated in the accompanying drawings. It is understood that these relative terms are intended to encompass different orientations of the device and/or elements in addition to the orientation depicted in the drawings. For example, if the device were inverted with respect to the view in the drawings, an element described as “above” another element, for example, would now be below that element.

The present teachings relate generally to inductively coupled plasma (ICP) spectroscopy, and more particularly to means for mounting an inductively coupled plasma source in a spectrometer for use in chemical analysis.

In accordance with a representative embodiment, a connector assembly for joining an induction coil to a radio frequency generator to provide together with a plasma torch, an inductively coupled plasma source for a spectrometer, comprises: a radial clamping member connected to the radio frequency generator, the radial clamping member having an internal surface configured to receive an end of an induction coil; and a sealing member. The connector assembly is configured to provide a secure connection between the end of the induction coil and the RF generator that is substantially electrically conductive and substantially liquid-tight without causing lasting deformation of the radial clamping member or the induction coil.

Illustratively, the radial clamping member may comprise a sleeve connected to the radio frequency generator, and a fastener (e.g., a nut). The sleeve provides the internal surface configured to receive the end of an induction coil and further has an external surface. The fastener has an internal surface configured to engage with the external surface of the sleeve to secure the connection between the radial clamping member and the end of the induction coil.

Moreover, the sleeve may include axial slots defining longitudinal segments. The longitudinal segments may have tapered ends configured to engage with a complementarily tapered internal surface of the fastener.

The fastener may have threads configured to engage with complementary threads provided on the external surface of the sleeve.

The sealing member may be ring-shaped, and may illustratively take the form of an O-ring type seal.

In a representative embodiment, a male connector element is mounted on an end of the induction coil for engagement with the internal surface of the sleeve. The sealing member may be mounted on the male connector element.

The male connector element may further include a guide to indicate the extent to which the male connector element is inserted into the sleeve. Use of the guide when installing or replacing the induction coil in an inductively coupled plasma spectrometer can indicate when a liquid-tight seal between the induction coil and the RF generator has been achieved. The guide could for example, take the form of a groove encircling the male connector element.

In accordance with an alternate representative embodiment, the internal surface of the sleeve engages directly with an end of the induction coil. In this embodiment, the need for a separate male connector element mounted on the induction coil is negated.

In accordance with another representative embodiment an inductively coupled plasma spectrometer comprises a plasma torch, an induction coil and a connector assembly for joining the induction coil to a radio frequency generator to provide an inductively coupled plasma source. The connector assembly comprises a radial clamping member that is a component of with the radio frequency generator. The radial clamping member has an internal surface configured to receive an end of an induction coil; and a sealing member. The connector assembly is configured to provide a secure connection between the end of the induction coil and the RF generator that is substantially electrically conductive and substantially liquid-tight without causing lasting deformation of the radial clamping member or the induction coil.

Illustratively, the radial clamping member may comprise a sleeve, associated with the radio frequency generator. The sleeve provides the internal surface configured to receive the end of an induction coil and further has an external surface. The radial clamping member further comprises a fastener having an internal surface configured to engage with the external surface of the sleeve to secure the connection between the radial clamping member and the end of the induction coil.

Moreover, the sleeve may include axial slots defining longitudinal segments. The longitudinal segments may have tapered ends configured to engage with a complementarily tapered internal surface of the fastener.

The fastener may have threads configured to engage with complementary threads provided on the external surface of the sleeve.

The sealing member may be ring-shaped, and may illustratively take the form of an O-ring type seal.

In a representative embodiment, a male connector element is mounted on an end of the induction coil for engagement with the internal surface of the sleeve. The sealing member may be mounted on the male connector element.

The male connector element may further comprise a guide to indicate the extent to which the male connector element is inserted into the sleeve. Use of the guide when installing or replacing the induction coil in an inductively coupled plasma spectrometer can indicate when a substantially liquid-tight seal between the induction coil and the RF generator has been achieved. The guide could for example, take the form of a groove encircling the male connector element.

In accordance with another representative embodiment, the internal surface of the sleeve engages directly with an end of the induction coil. In this representative embodiment, there is no need for a separate male connector element.

In accordance with another representative embodiment, a method is provided for securing a connection between an induction coil and a radio frequency generator to provide, together with a plasma torch, an inductively coupled plasma source for a spectrometer. The method comprises providing a connector assembly comprising a radial clamping member associated with the radio frequency generator. The radial clamping member has an internal surface configured to receive an end of an induction coil; and a sealing member. The method also comprises inserting an end of the induction coil into the radial clamping member such that the sealing member provides a substantially liquid-tight seal between the induction coil and the internal surface of the radial clamping member. The method also comprises fastening a radial clamping member to secure the connection between the induction coil and the RF generator. Beneficially, the connection is both substantially electrically conductive and substantially liquid-tight without lasting deformation of the radial clamping member or the induction coil.

Referring to FIG. 1, an example of a known inductively coupled plasma (ICP) source 100 is shown. The ICP source 100 generates and sustains a plasma 130 used for example in inductively coupled plasma optical emission spectroscopy (ICP-OES) or inductively coupled plasma mass spectrometry (ICP-MS) to detect trace elements in a sample.

The ICP source 100 comprises a plasma torch 110 and an induction coil 120 for sustaining a plasma 130 by coupling radio frequency electro-magnetic energy to a suitable gas 140, such as argon, which flows through the torch. The induction coil 120 is typically formed into a helix and is positioned concentrically around the portion of the torch 110 where the plasma 130 is to be generated.

The torch 110 consists of three concentric glass tubes 150*a*, 150*b*, 150*c*. When the torch 110 is turned on, an intense electromagnetic field 160 is created within the coil 120 by the high power radio frequency (RF) signal flowing through the coil. The RF signal is created by an RF generator (not shown).

The argon gas 140 is ionized in the intense electromagnetic field 160 and flows in a rotationally symmetrical pattern towards the magnetic field 160 of the induction coil 120. A stable, high temperature plasma is generated as a result of the inelastic collisions between the charged particles and the neutral argon atoms.

Figure 2:
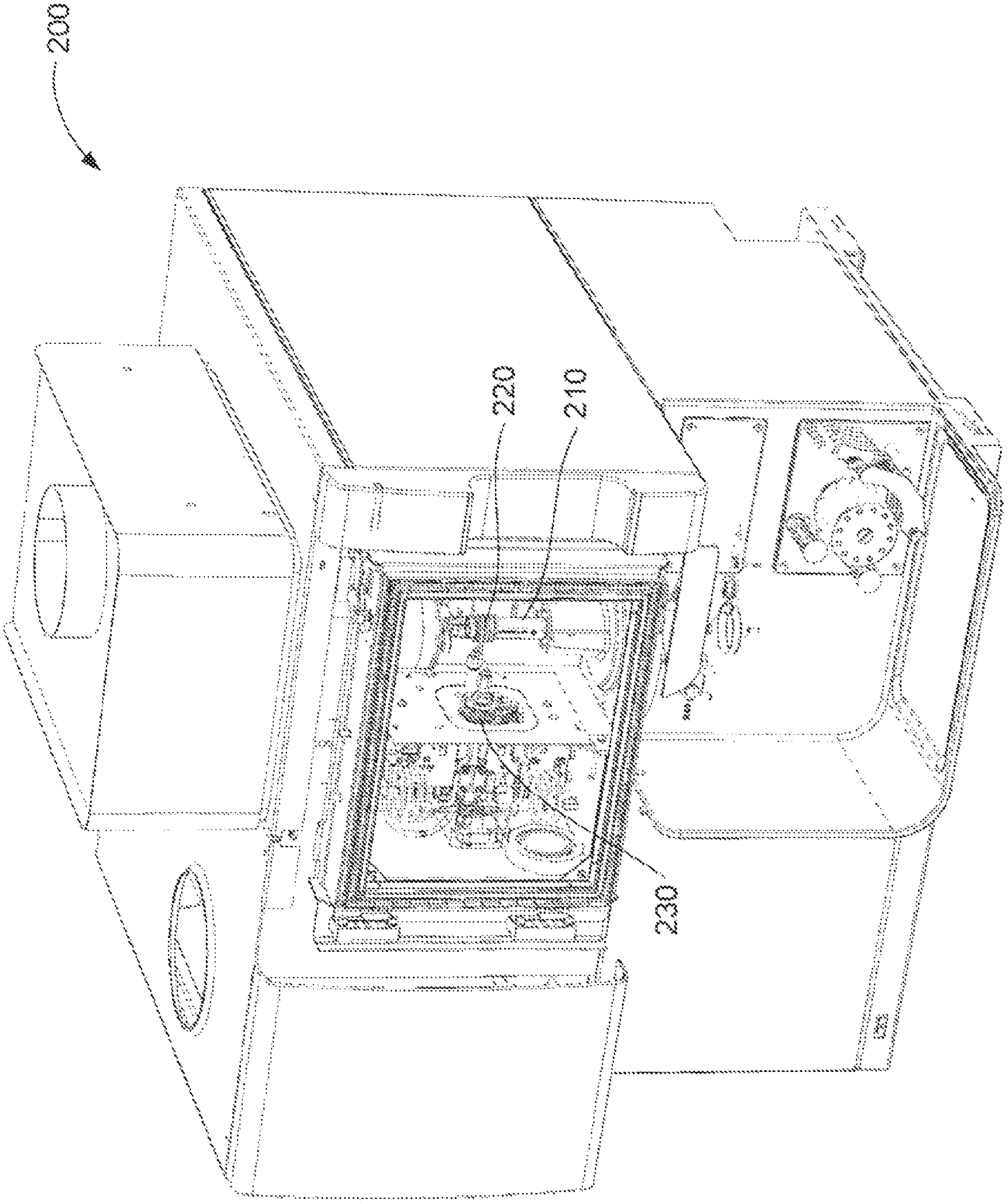
FIG. 2 is an isometric view of an inductively coupled plasma (ICP) spectrometer including an inductively coupled plasma source coupled to a radio frequency generator using the connector assembly according to a representative embodiment.

Referring to FIG. 2, an inductively coupled plasma Optical Emission (ICP-OES) spectrometer 200 in accordance with a representative embodiment is depicted. FIG. 2 shows the position of an inductively coupled plasma source comprising a torch 210 and an induction coil 220, which is coupled to an RF generator 230. The connector assembly, for joining the induction coil 220 to the RF generator 230 to provide the inductively coupled plasma source, is shown in more detail in the subsequent Figures.

Figure 3A:
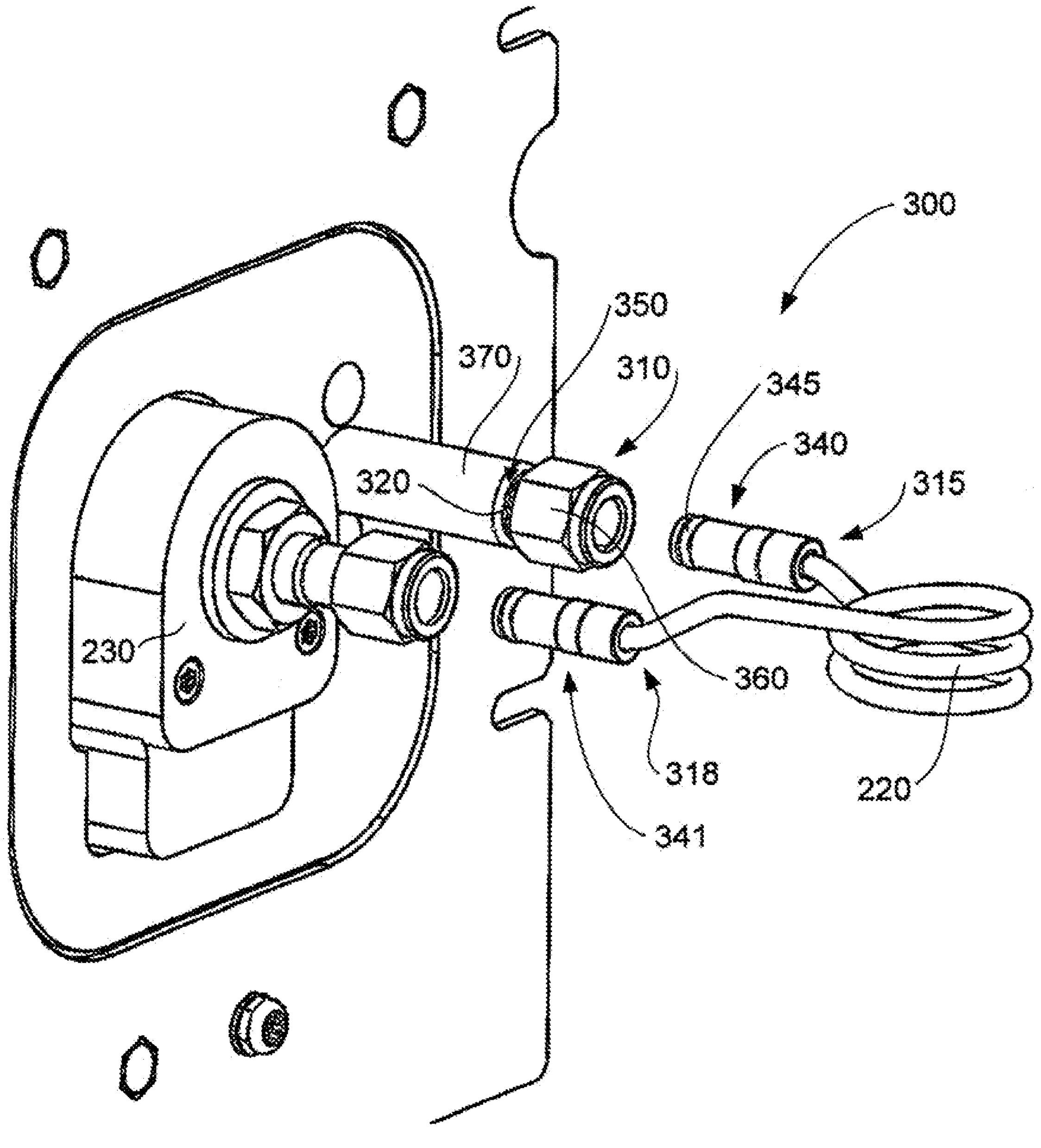
FIG. 3A is an isometric view of the connection assembly for joining an induction coil to a radio frequency generator according to a representative embodiment.

Referring to FIG. 3A, a representative embodiment of the connection assembly 300 for joining an induction coil 220 to a radio frequency generator 230 is shown. Together with a plasma torch (not shown in FIG. 3A, see FIG. 4), the induction coil 220 provides an inductively coupled plasma source for a spectrometer (not shown in FIG. 3A, see FIG. 2).

The connection assembly 300 comprises a radial clamping member 310 and a sealing member 345. The radial clamping member 310 is configured to receive an end of the induction coil 220. Together, the elements of the connector assembly 300 are configured to provide a secure connection, which is substantially electrically conductive and substantially liquid-tight, between the end of the induction coil 220 and the RF generator 230. Notably, the connection assembly 300 that the substantially electrically conductive and substantially liquid-tight connection is achieved without causing lasting deformation of the either the radial clamping member 310 or the induction coil 220 itself. Beneficially, and in contrast to known connections, the induction coil can be repeatedly re-fitted and aligned using the connection assembly 300 of the representative embodiments.

It is to be understood that the requirement for a substantially liquid-tight connection is fulfilled, by the connection assembly being as water-tight, or liquid-tight as a standard industrial fittings used elsewhere in a spectrometer. For example, the connection assembly would be expected to be able to withstand the nominal working pressure of such an instrument in addition to any dynamic effects. This may be qualified by a hydrostatic pressure test of up to 1.2 MPa of liquid pressure, with zero leaks, for example.

In the case of the requirement for a substantially electrically conductive connection, this could be satisfied for example by a measure resistance of less than five milli-Ohm ($<5\ m\Omega$), and able to support current flow of one hundred Amperes (100 A) in the case of a DC current. Similarly, since this is part of a RF system where AC current oscillates at 27 MHz or greater, the impedance must be similarly low.

Figure 3B:
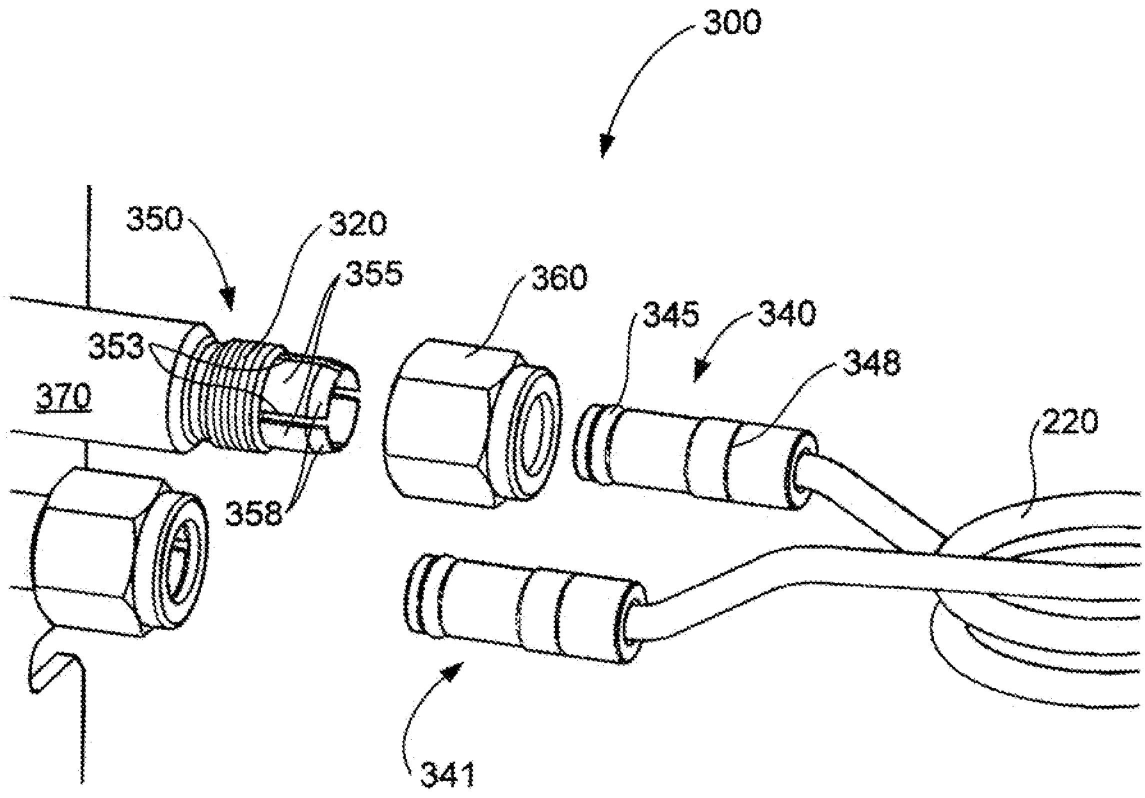
FIG. 3B is an exploded isometric view of the connection assembly of FIG. 3A.

As is more clearly shown in FIG. 3B, which shows an exploded view of the connection assembly of FIG. 3A, the radial clamping member 310 generally comprises two parts: a sleeve 350 and a fastener 360. The sleeve 350 is connected at one end with the radio frequency generator 230 (see FIG. 3A), for example via the RF stanchion 370. The RF stanchion 370 comprises a precision bore. The sleeve 350 is configured to receive an end of the induction coil 220 through the end opposing the end of the sleeve associated with the RF stanchion 370. Illustratively, the external surface of the sleeve 350 may be threaded 320.

The sleeve 350 is a substantially cylindrical sleeve and comprises axial slots 353, which define longitudinal segments 355 (sometimes referred to as fingers). The longitudinal segments 355 exert a clamping force on the end of the induction coil 220 when the induction coil 220 is inserted into the sleeve 350. The longitudinal segments 355 may be radially inwardly biased to optimize the clamping force exerted on the end of the induction coil 220.

Figure 5:
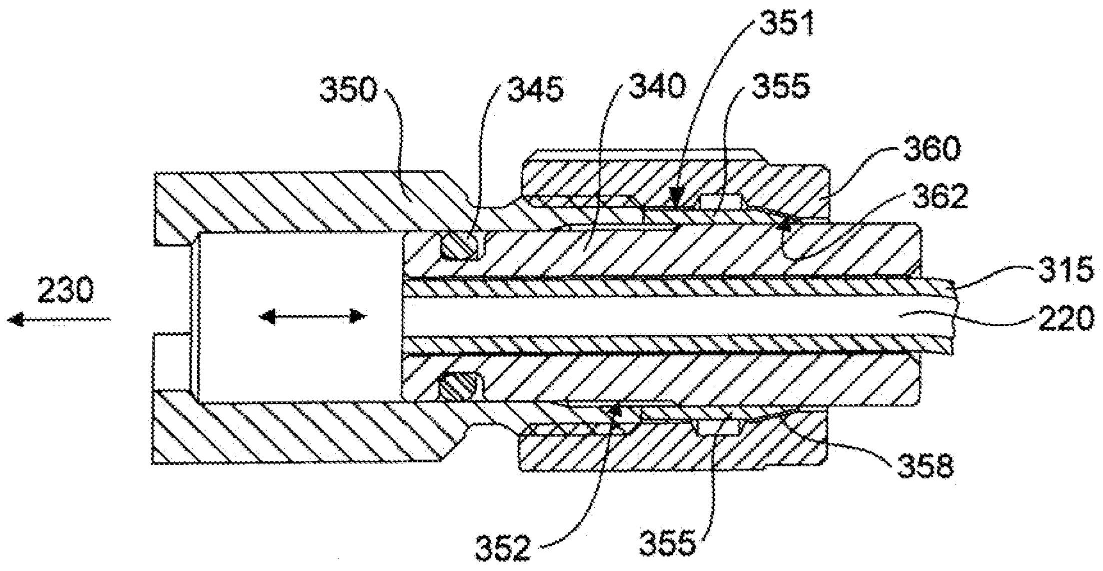
FIG. 5 is an enlarged cross-sectional view through the connection assembly of FIGS. 3A, 3B and 4.

Referring now to FIG. 5, the radially inward biasing of the longitudinal segments 355 is largely effected by engagement of the internal surface 362 of the fastener 360 with the external surface 351 of the sleeve 350. This engagement farther serves to secure the connection between the radial clamping member 310 and the end of the induction coil 220. In order to complement the external threaded surface 320 of the sleeve 350, the internal surface 362 of the fastener 360 may be complementarily threaded (not shown). The fastener 350 can be finger tightened, or may be tightened with a wrench, shifter or similar tool.

In the representative embodiment shown in FIGS. 3A and 3B, the connection assembly 300 comprises a male connector element 340 is connected to at least one end 315 of the induction coil 220. In the illustrated embodiment, a male connector element 340 is connected to end 315 and another male connector element 341 is connected to end 318 of the induction coil 220. In the illustrated case, the sleeve 350 receives the male connector element 340 which is mounted on the induction coil 220.

The male connector element 340 is elongate in form and the sealing member 345 is illustratively mounted thereon. The sealing member 345 engages with an internal surface of the sleeve 350 when the sleeve 350 receives the male connector element. Engagement between the sealing member 345 and the internal surface of the sleeve 350 provides a substantially liquid-tight seal. The sealing member 345 is illustratively embedded in a recess or groove which encircles the male connector element. The sealing member 345 may be ring-shaped to encircle the male connector element 340, and may take the form of an O-ring, for example. In the illustrated embodiment, the male connector element 340 takes the form of a precision machined sleeve mounted to the end of the induction coil 220 and may be soldered, brazed or otherwise held in position.

A guide 348 may be provided on the male connector element 340 for the purposes of indicating the extent to which the male connector element is inserted into the sleeve 350. That is, the position of the induction coil 220 can be axially adjusted by moving the male connector element 340 into or out of the sleeve 350. This makes it possible to adjust the position of the induction coil 220 relative to the torch (not shown in FIG. 3B, see FIG. 4). The guide 348 indicates to a technician who is installing or replacing the induction coil 220 or adjusting its position, the minimum extent to which the male connector member 340 should be inserted into the sleeve 350 to form a substantially electrically conductive and substantially liquid-tight connection. For example, the connection assembly 300 may be configured to permit between approximately 5 mm and to approximately 10 mm of axial adjustment. The guide 348 can be provided as a groove encircling the male connector element 340. Beneficially, by axially adjusting the coupling between connection assembly 300 and the alignment of the induction coil 220 with the plasma torch is realized. Similarly, by telescopically adjusting one end of the induction coil 220, radial alignment of the induction coil 220 with respect to the plasma torch is realized.

Figure 4:
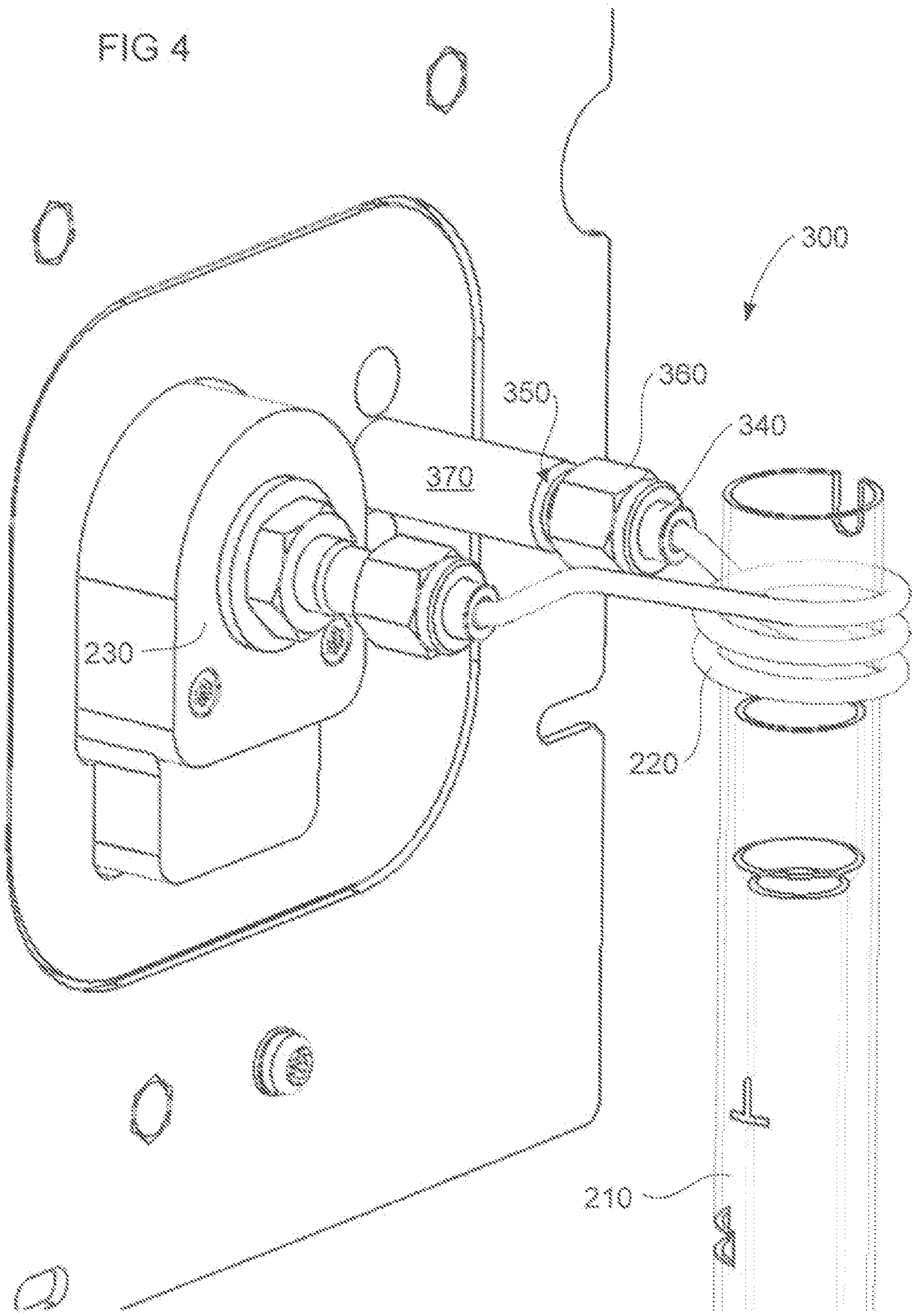
FIG. 4 is an isometric view showing the position of the plasma torch relative to the connection assembly and the induction coil according to a representative embodiment.

Referring now to FIG. 4, a coupled connector assembly 300 is shown together with a torch 210. The induction coil 220 is positioned concentrically around the torch 210. The male connector element 340 is received by the sleeve 350 and the fastener 360 secures the connection there between.

Referring now to FIG. 5 which shows a cross-section through the coupled connector assembly, the longitudinal segments 355 have tapered ends 358 configured to engage with a complementarily tapered internal surface 362 of the fastener 360. The degree of taper on the tapered ends 358 of the longitudinal segments 355, is any suitable angle being complementary to the degree of taper within the fastener 360. For example, the degree of taper could be between approximately 10° and approximately 20° radially inward.

The radial clamping member 310 comprising the sleeve 350 and the fastener 360 forms a collet-style clamp. The tapered ends 358 of the longitudinal segments 355 provide a mechanical advantage by exerting a significant clamping force relative to the torque applied to the fastener 360. When the fastener 360 is fastened over the sleeve 350 and tightened, a twisting torque acts on the RF stanchion 370 directly. Since the RF stanchion 370 is a larger machined component, which is secured in position with fasteners, it is able to withstand the torque applied to the fastener 360 without transferring it to the induction coil 220 which would cause distortion. Rather, the induction coil 220 is subject to an even, concentric and quasi-static compression load and therefore should remain substantially free front distortion caused by the torque resulting from tightening of the fastener 360. As such, lasting deformation of the either the radial clamping member 310 or the induction coil 220 itself is substantially avoided. Beneficially, and as noted above, the induction coil 220 can be repeatedly re-fitted and aligned using the connection assembly 300 of the representative embodiments.

As already foreshadowed, the sleeve 350 has an internal and an external surface which is shown in FIG. 5. The external surface 351 of the sleeve 350 is configured to engage with the internal surface of the fastener 362 to secure the connection between the male connector element 340 and the sleeve 350. The internal surface 352 of the sleeve 350 is engaged by the sealing member 345 of the male connector element 340 to form a substantially liquid-tight seal.

Figure 6A:
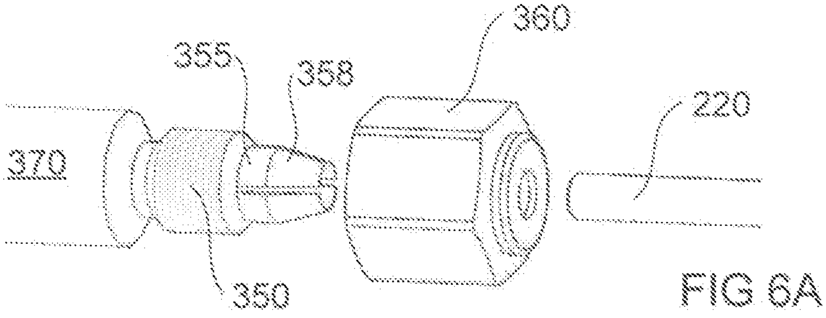
FIG. 6A is an exploded isometric view of a connection assembly for joining an induction coil to a radio frequency generator according to another a representative embodiment.
Figure 6B:
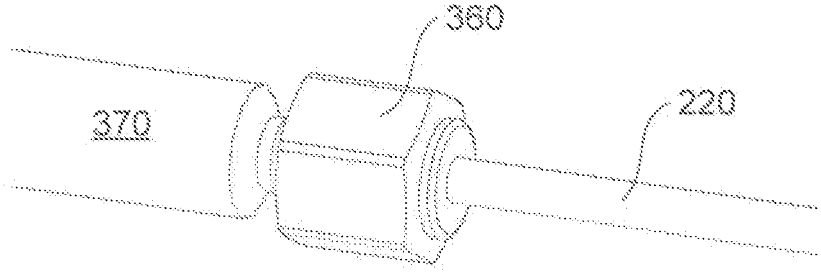
FIG. 6B is an isometric view of the connection assembly FIG. 6A in a coupled state.
Figure 7:
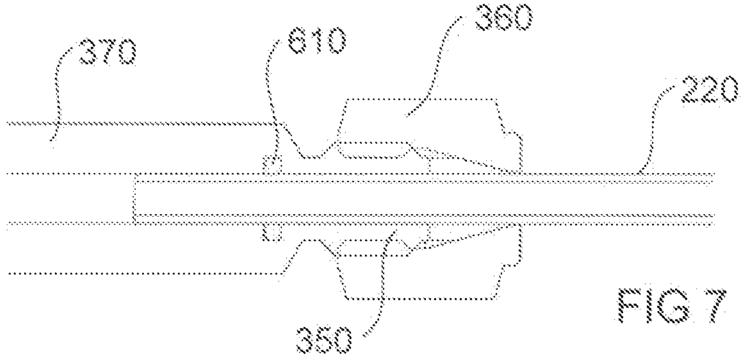
FIG. 7 is a cross-sectional view through the coupled connection assembly of FIG. 6B.

Referring now to FIGS. 6A, 6B and 7 there is shown an alternate representative embodiment which does not use a male connector element as illustrated in relation to the embodiment described with reference to FIGS. 3A, 3B, 4 and 5. In such an embodiment, the internal surface of the sleeve 350 engages directly with an end of the induction coil 220 negating the need for a male connector element. The radial clamping member comprising the sleeve 350 and the fastener 360 act directly upon an end of the induction coil 220 to provide the secure connection between the RF generator and the induction coil. The sleeve 350 has the same configuration as earlier described with axial slots 353 defining longitudinal segments 355 which exert a clamping force on the end of the induction coil 220. Ends of the longitudinal segments 358 are tapered.

In the representative embodiment in which no male connector element is provided, a sealing member 610 is disposed so as to engage directly with the induction coil 220 to form the substantially liquid-tight seal between the internal surface of the sleeve 350 and the induction coil 220. The sealing member may be suitably disposed within the RF stanchion 370, proximal to the sleeve 350 as shown in FIG. 7. However, one of skill in the relevant art will appreciate that alternate configurations are possible, including, for example, the use of more than one sealing member 610 to achieve the desired substantially liquid-tight seal and variations in the position of the sealing member 345 with reference to the radial clamping member 310.

The connector assembly 300 of the present invention may be provided to couple an induction coil 220 to an RF generator 230 in an existing spectrometer, or may be supplied as part of a spectrometer 200 including the innovative coupling mechanism. Moreover, replacement induction coils having the male connector element associated at one or both ends, may be provided in accordance with the present teachings.

The connector assembly according to the present teachings disclosed beneficially provides a substantially liquid-tight seal and substantially electrically conductive connection whilst solving one or more issues arising with prior art solutions. Using the connector assembly of the present teachings, the induction coil can be entirely repositioned to achieve optimized alignment at any time. That is, the induction coil may be adjusted axially, i.e. by telescopically adjusting the coupling between the male connector element and the female connector element, as well as rotationally, by telescopically adjusting one end of the induction coil, to ensure optimal alignment of the induction coil with respect to the plasma torch. Any requirement to reposition the induction coil during installation, or subsequent thereto, will not adversely impact the liquid-tight and electrically conductive seal and accordingly, can even be performed without turning off the pressurized liquid-cooling as is required by conventional compression style fittings.

The connector assembly of the present teaching isolates the induction coil from torque that is otherwise transferred by tightening of the nut, as occurs with compression style fittings. This ameliorates the problem of induction coil distortion during installation and replacement and accordingly improves the lack of repeatability caused by prior art fittings due to variations in the amount of torque applied by technicians during tightening of the compression style fitting and the coefficients of friction in the ferrule/nut engagement therein. The repeatability of the low-resistance electrical connection is improved by virtue of the superior clamping force applied by the radial clamping member of the connector assembly and the increased contact surface area of the female connector element.

One of ordinary skill in the art will appreciate that may be variations that are in accordance with the present teachings are possible and remain within the scope of the appended claims. These and other variations would become clear to one of ordinary skill in the art after inspection of the specification, drawings and claims herein. The invention therefore is not to be restricted except within the spirit and scope of the appended claims.

The invention claimed is:

1. A connector assembly configured to join an induction coil to a radio frequency generator to provide, together with a plasma torch, an inductively coupled plasma source for a spectrometer, the connector assembly comprising:

a radial clamping member associated with the radio frequency generator, the radial clamping member comprising an internal surface configured to receive an end of an induction coil; and a sealing member, wherein the connector assembly is configured to provide a secure connection between the end of the induction coil and the RF generator that is substantially electrically conductive and substantially liquid-tight without causing lasting deformation of the radial clamping member and wherein the sealing member enables telescopic adjustment of the induction coil position while maintaining the substantially liquid-tight secure connection between the end of the induction coil and the RF generator; and wherein the tightening or fastening of the radial clamping member does not distort or deform the induction coil in any way elastically or plastically.

2. A connector assembly configured to join an induction coil to a radio frequency generator according to claim 1, wherein the radial clamping member comprises:

a sleeve associated with the radio frequency generator, the sleeve member having the internal surface configured to receive the end of an induction coil and further having an external surface; and a fastener having an internal surface configured to engage the external surface of the sleeve to substantially secure the connection between the radial clamping member and the end of the induction coil.

3. A connector assembly configured to join an induction coil to a radio frequency generator according to claim 2, wherein the sleeve comprises axial slots defining longitudinal segments.

4. A connector assembly configured to join an induction coil to a radio frequency generator according to claim 3, wherein the longitudinal segments have tapered ends configured to engage with a complementarily tapered internal surface of the fastener.

5. A connector assembly configured to join an induction coil to a radio frequency generator according to claim 2, wherein the internal surface of the fastener has threads configured to engage with complementary threads provided on the external surface of the sleeve.

6. A connector assembly configured to join an induction coil to a radio frequency generator according to claim 2, further including a male connector element mounted on an end of the induction coil for engagement with the internal surface of the sleeve.

7. A connector assembly configured to join an induction coil to a radio frequency generator according to claim 6, wherein the sealing member is mounted on the male connector element.

8. A connector assembly configured to join an induction coil to a radio frequency generator according to claim 6, wherein the male connector element comprises a guide to indicate the extent to which the male connector element is inserted into the sleeve.

9. A connector assembly configured to join an induction coil to a radio frequency generator according to claim 2, wherein the internal surface of the sleeve engages directly with an end of the induction coil.

10. An inductively coupled plasma spectrometer comprising a plasma torch, an induction coil and a connector assembly configured to join the induction coil to a radio frequency generator to provide an inductively coupled plasma source, the connector assembly comprising:

a. a radial clamping member associated with the radio frequency generator, the radial clamping member having an internal surface configured to receive an end of an induction coil; and b. a sealing member;

wherein the connector assembly is configured to provide a secure connection between the end of the induction coil and the RF generator that is substantially electrically conductive and substantially liquid-tight without causing lasting deformation of the radial clamping member and wherein the sealing member enables telescopic adjustment of the induction coil position while maintaining the substantially liquid-tight secure connection between the end of the induction coil and the RF generator; and wherein the tightening or fastening of the radial clamping member does not distort or deform the induction coil in any way elastically or plastically.

11. An inductively coupled plasma spectrometer according to claim 10, wherein the radial clamping member comprises:

a. a sleeve associated with the radio frequency generator, the sleeve providing the internal surface configured to receive the end of an induction coil and further having an external surface; and b. a fastener having an internal surface configured to engage with the external surface of the sleeve to secure the connection between the radial clamping member and the end of the induction coil.

12. An inductively coupled plasma spectrometer according to claim 11, wherein the sleeve comprises axial slots defining longitudinal segments.

13. An inductively coupled plasma spectrometer according to claim 12, wherein the longitudinal segments have tapered ends configured to engage with a complementarily tapered internal surface of the fastener.

14. An inductively coupled plasma spectrometer according to claim 11, wherein the internal surface of the fastener has threads configured to engage with complementary threads provided on the external surface of the sleeve.

15. An inductively coupled plasma spectrometer according to claim 11, further including a male connector element mounted on the end of the induction coil for engagement with the internal surface of the sleeve.

16. An inductively coupled plasma spectrometer according to claim 15, wherein the sealing member is mounted on the male connector element.

17. An inductively coupled plasma spectrometer according to claim 15, wherein the male connector element comprises a guide to indicate the extent to which the male connector element is inserted into the sleeve.

18. An inductively coupled plasma spectrometer according to claim 11, wherein the internal surface of the sleeve engages directly with the end of the induction coil.

19. A method for securing a connection between an induction coil and a radio frequency generator to provide, together with a plasma torch, an inductively coupled plasma source for a spectrometer, the method including the steps of:

a. providing a connector assembly comprising:

i. a radial clamping member associated with the radio frequency generator, the radial clamping member having an internal surface configured to receive an end of an induction coil; and ii. a sealing member;

b. inserting an end of the induction coil into the radial damping member; and c. fastening the radial clamping member to secure the connection between the induction coil and the RF generator such that it is both substantially electrically conductive and substantially liquid-tight without lasting deformation of the radial clamping member and wherein the sealing member enables telescopic adjustment of the induction coil position while maintaining the substantially liquid-tight secure connection between the end of the induction coil and the RF generator; and wherein the tightening or fastening of the radial clamping member does not distort or deform the induction coil in any way elastically or plastically.

20. A method for securing a connection between an induction coil and a radio frequency generator according to claim 19, wherein the radial clamping member comprises a sleeve associated with the radio frequency generator, the sleeve providing the internal surface configured to receive the end of an induction coil and further having an external surface; and a fastener having an internal surface configured to engage with the external surface of the sleeve, and the step of fastening securing the radial clamping member comprises threading the fastener over at least a portion of the sleeve to secure the connection between the induction coil and the radio frequency generator.

* * * * *